United States Patent
Alabaster

(12)
(10) Patent No.: US 6,585,516 B1
(45) Date of Patent: Jul. 1, 2003

(54) METHOD AND SYSTEM FOR COMPUTERIZED VISUAL BEHAVIOR ANALYSIS, TRAINING, AND PLANNING

(76) Inventor: Oliver Alabaster, 4318 Adrienne Dr., Alexandria, VA (US) 22309

( * ) Notice: Subject to any disclaimer, the term of this patent is extended or adjusted under 35 U.S.C. 154(b) by 0 days.

(21) Appl. No.: 10/040,465

(22) Filed: Jan. 9, 2002

(51) Int. Cl.[7] .......................... G09B 19/00; G06F 17/00
(52) U.S. Cl. ...................................... 434/127; 128/921
(58) Field of Search .................... 434/127; 128/921; 700/104.1

(56) References Cited

U.S. PATENT DOCUMENTS

| | | | | |
|---|---|---|---|---|
| 5,317,134 A | * | 5/1994 | Edamura | 219/720 |
| 5,412,560 A | * | 5/1995 | Dennison | 600/300 |
| 5,454,721 A | * | 10/1995 | Kuch | 434/127 |
| 5,832,446 A | * | 11/1998 | Neuhaus | 705/1 |
| 5,845,263 A | * | 12/1998 | Camaisa et al. | 705/27 |
| 6,236,974 B1 | * | 5/2001 | Kolawa et al. | 705/7 |
| 6,381,614 B1 | * | 4/2002 | Barnett et al. | 707/104.1 |
| 2001/0000810 A1 | | 5/2001 | Alabaster | 707/104.1 |
| 2001/0005830 A1 | * | 6/2001 | Kuroyanagi | 705/2 |
| 2002/0046060 A1 | * | 4/2002 | Hoskyns et al. | 705/2 |
| 2002/0059311 A1 | * | 5/2002 | Nishina | 707/200 |

FOREIGN PATENT DOCUMENTS

| JP | 407021267 A | * | 1/1995 | G06F/17/60 |
|---|---|---|---|---|

OTHER PUBLICATIONS

Molbak, Jens, "Meals.com is Key Ingredient for Web Sites; New Strategy Makes Meals.com Available to Millions More Worldwide", Jul. 26, 2000, Business Wire.*

* cited by examiner

*Primary Examiner*—John Edmund Rovnak
(74) *Attorney, Agent, or Firm*—Piper Rudnick LLP; Steven B. Kelber

(57) ABSTRACT

A system and method for computerized visual behavior analysis, training, and planning. The system includes a User Interface (UI), a Meal Database, a Food Database, a Picture Menus, and a Meal Builder. The method can include the following steps. First, the Meal Database and the Food Database can be prepared. Second, the user can use the Picture Menus to choose meals for a particular time period to correspond to a customized eating plan. Third, the user can decide whether or not to change one or more of the meals he has chosen for the particular time period. If the user decides to change his chosen meals, the user can edit or create new meals using the Meal Builder. If the user decides not to change his choices, or after the user changes his choices, the user can save the meals for the particular time period.

18 Claims, 10 Drawing Sheets

US 6,585,516 B1

METHOD AND SYSTEM FOR COMPUTERIZED VISUAL BEHAVIOR ANALYSIS, TRAINING, AND PLANNING

BACKGROUND OF THE INVENTION

1. Field of the Invention

The subject invention relates to the field of computer-based methods of employing visual techniques for training individuals to modify behavior, and planning by individuals for modified behavior. Specific applications include training individuals to modify diet behavior, and planning by individuals for improved diet practices.

2. Background of the Technology

Present methods of evaluating dietary habits, motivating people to change eating habits, and teaching people how to make healthier food choices are woefully inadequate. Twenty years ago, twenty percent (20%) of Americans were obese. Now thirty-five percent (35%) of Americans are obese, despite the sales of countless diet books and the increasing availability of low calorie and low fat foods. In fact, American dietary habits were responsible for approximately forty percent (40%) of deaths in 1990, and they continue to produce an epidemic of obesity that is out of control.

No effective tools exist for either health processionals or the public that can adequately train people to understand and immediately recognize. the significance of (1) the impact of customized meals on dietary goals; (2) the value and amount of specific macro and micro nutrients in different foods; (3) the potentially harmful effects of other naturally occurring substances found in many foods; and (4) the relative quantities of different food choices. Nor are there any planning tools that can show people how to create meals using food choices that are much more healthful for them and their families. In addition, no planning tools exist that use natural visual techniques to assist people to follow diet programs designed by health professionals.

Finally, no tools exist that allow user's to incorporate a behavior analysis into their eating goals, and their training or planning for meeting those eating goals. The behavior analysis collects and analyzes specific information on a user's instinctive eating tendencies and preferences. The behavior analysis can also compare the specific information to a set of goals. Allowing a user to incorporate the user's instinctive eating tendencies and preferences into his eating plan can have a profound effect on how effective the eating plan is. Food preferences can strongly influence the risk of obesity, diabetes, heart disease and cancer.

3. Related Art

U.S. Pat. No. 5,454,721 to Kuch discloses a system intended to teach individuals the relationship between the visual size and a few nutritional characteristics of portions of food by using either a life size image of, or the corporeal finger of the individual, as a scale against images of different sized portions of different kinds of food, while showing a few nutritional characteristics of such portions. The system proposed by Kuch is limited, in that, for example, it does not evaluate the user's ability to visually estimate macro and micro nutrient content of meals. Nor does it permit or incorporate analysis of an individual's natural tendencies and preferences. In addition, Kuch does not allow the user to prepare and plan and adapt meals that will help the user meet his customized eating goals.

U.S. Pat. No. 5,412,560 to Dennision relates to a method for evaluating and analyzing food choices. The method relies on input by the individual or user of food actually consumed by the user during a given period of time and employs a computer program which attempts to estimate the actual intake of nutrients by the individual and to compare that intake to a recommended range of nutrients, such as those contained in dietary guidelines issued nationally in the United States. The approach of the Dennision patent is undesirable in that it relies on the individual to provide accurate input data as to his actual food intake, a task as to which there are many known obstacles and impediments, i.e., the approach is not "user friendly." Additionally, no graphic visual displays are provided, which further detracts from ease of use, comprehension and effectiveness.

SUMMARY OF THE INVENTION

The present invention can solve the above problems by providing a system and method for computerized behavior analysis, training, and planning. The system of programs can include a User Interface (UI), a Meal Database, a Food Database, Picture Menus, and a Meal Builder.

The UI can receive commands from the user and display results to the user from the Picture Menus and Meal Builder. The Meal Database can be a database of pre-set meals comprising combinations of foods that conform to predetermined characteristics that have been compiled. The Food Database is a database of foods that have been compiled. (Commercially made or pre-made meals can be included.)

In an alternate embodiment, the Meal Database and the Food Database can incorporate a behavior analysis. As explained in detail in pending U.S. patent applications Ser. Nos. 09/211,392, 09/461,664, and 09/734,711 (incorporated by reference), a behavior analysis comprises compiling and analyzing specific information on a user's instinctive preferences and tendencies. A behavior analysis can also compare the specific information to a set of goals. In an exemplary embodiment, the behavior analysis can be a diet behavior analysis which compiles and analyzes specific information on a user's instinctive eating preferences and tendencies, and then compares the specific information to a set of customized eating goals. Thus, the Meal Database and Food Database can be modified to include meals that the user has indicated he likes. In an alternative embodiment, meals that the user dislikes can be ignored by the user or deleted from the Meal Database and the Food Database.

The Picture Menus can display on the User Interface meals from the Database that the user can mix and match and still meet customized eating goals. The Picture Menus provide a quick and easy system of dietary impact (including nutritional and caloric impact) controlled meals that the user can mix and match at various nutritional, caloric, and other levels. In an exemplary embodiment, the invention can define the user's nutritional, caloric and other needs and let the user choose the diet he wants to follow. In response to data input regarding personal characteristics and activity level, calorie goals are defined, and daily meals are combined (and modified) to produce a daily total of various nutrients which can vary only +/−5% from the diet goals before a warning appears. While following the Picture Menus, the user can track his progress. If after a certain amount of time, the user hasn't yet reached his target weight, he can repeat the Picture Menus as often as necessary. Once the user's weight has stabilized, he can use the Picture Menus to maintain his weight.

The Meal Builder can display on the User Interface meals from the Database, corresponding to the Picture Menus, where the user can change and view the meals' impact on customized eating goals. The Meal Builder can be a very useful tool, not only for modifying and personalizing Picture Menus, but also for designing meals and picturing favorite recipes. The Meal Builder can be a scoring system that allows the user to view, in real time, the impact of food choices on customized eating goals, and the accumulated impact on daily nutrition allowance made by saved meals and snacks throughout the day. The approximate distribution of calories and nutrients for each meal and snack can be shown using a selected diet plan.

The method for computerized behavior analysis, training, and planning can include the following steps. First, the Meal Database and Food Database can be prepared. Second, the user can choose meals for a particular day. Third, the user can decide whether or not to change one or more of the meals he has chosen for the particular day. If the user decides to change his chosen meals, the user can edit or create new meals using the Meal Builder. If the user decides not to change his choices, or after the user changes his choices, the user can save the meals for the particular day.

DETAILED DESCRIPTION OF THE INVENTION

The present invention will be discussed with reference to preferred embodiments. Specific details will be set forth to provide a thorough understanding of the present invention. The preferred embodiments discussed herein should not be understood to limit the invention.

Figure 1:
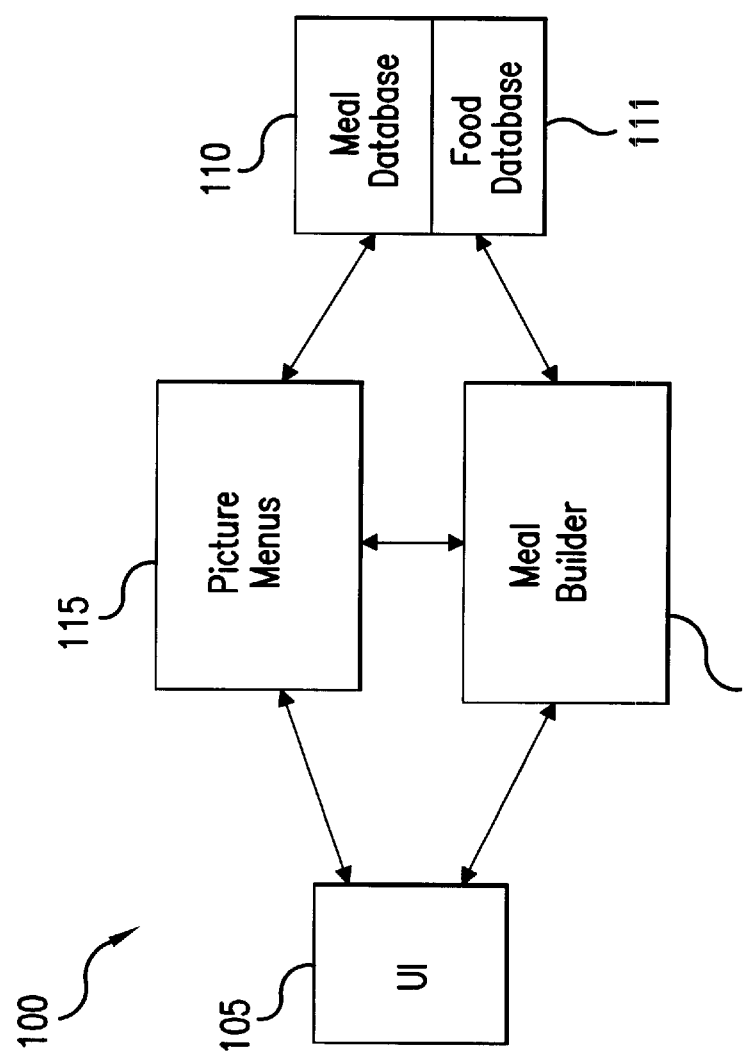
FIG. 1 displays the underlying architecture of an exemplary embodiment of the present invention.

FIG. 1 displays the underlying architecture of an exemplary embodiment of the present invention. The system 100 includes a User Interface (UI) 105, a Meal Database 110, a Food Database 111, a Picture Menus 115, and a Meal Builder 120.

The UI 105 can receive commands from the user and display results to the user from the Picture Menus 115 and Meal Builder 120.

The Meal Database 110 is a database of pre-set meals that has been compiled. The Food Database 111 is a database of foods that has been compiled.

In an alternative embodiment, the Meal Database 110 and/or the Food Database 111 can incorporate a diet behavior analysis. These Databases 110 and 111 can be based on a diet behavior analysis of the user. These Databases 110 and 115 are customized through the expansion of the addition of foods and meals that conform to the users taste preferences and dietary goals. If the program learns the user likes certain foods, it will offer those foods first. If the program learns the user likes certain meals, it will offer those meals first. In an alternative embodiment, a user can populate a particular database with meals he has created.

The Picture Menus 115 are a quick and easy system of dietary impact controlled instant meals that the user can mix and match at various nutritional, caloric, and other levels. Picture Menus 115 can be used as a stand-alone feature, or can include the Meal Builder 120. In an exemplary embodiment, the invention has already defined the user's nutritional, caloric, and other needs and has let the user choose the diet he wants to follow. In an exemplary embodiment, the user has also indicated his preferences and tendencies in a behavioral analysis. Daily meals are combined to produce a daily total of various nutrients which can vary only +/−5% from the diet goals before a warning appears. While following the Picture Menus 115, the user can track his progress. If after a certain amount of time, the user hasn't yet reached his target weight, he can repeat the Picture Menus 115 as often as necessary. Once the user's weight has stabilized, he can use the Picture Menus 115 to maintain his weight.

The Meal Builder 120 is a very useful tool, not only for modifying and personalizing Picture Menus 115, but also for designing meals and picturing favorite recipes. Meal Builder 120 can be used as a stand-alone feature, or can be used with the Picture Menus 115. Meal Builder 120 incorporates a scoring system that allows the user to view, in real time, the impact of food choices on daily intake, and the accumulated impact on daily nutrition allowance made by saved meals and snacks throughout the day. The approximate distribution of calories and nutrients for each meal and snack can be shown using a selected diet plan.

Figure 2:
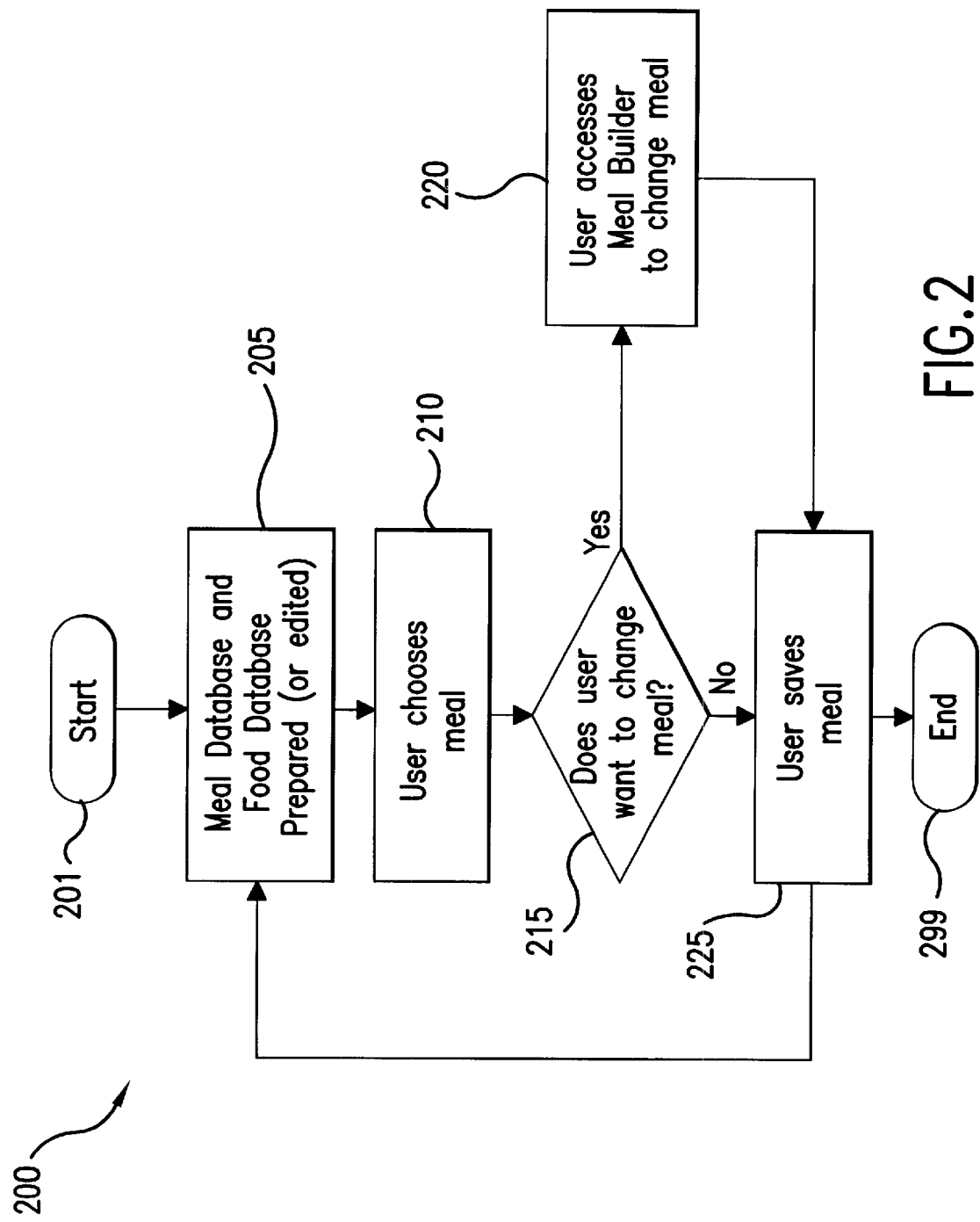
FIG. 2 is a flow chart illustrating an exemplary overview process.

FIG. 2 is a flow chart illustrating an exemplary overview process 200. The overview process 200 starts with step 210. In step 205, a Meal Database 110 and Food Database 111 areprepared (or edited). In step 210, the user chooses meals (breakfast, lunch, dinner, and snacks) for a day. The terms breakfast, lunch, dinner, and snacks do not require a balanced or traditional meal, but simply denote food choices the user can make. For example, though unwise, a user can choose a plate of potato chips for breakfast and see how this affects his dietary goals. In an exemplary embodiment, the Picture Menus 115 are based upon the following distribution of calories: breakfast 25%, lunch 30%, snacks/beverages 15%, dinner 30%. These levels can be changed when the meals are edited using Meal Builder 120. However, daily meals are combined to produce a daily total which can vary only +/−5% before a warning appears. In step 215, the user decides whether or not to change the meals he has chosen for the day. If the user decides to change his chosen meals, the process moves to step 220, where the user can change (edit or create) meals using Meal Builder 120. If the user decides not to change his choices in 215, or after the user changes his choices in 220, the process moves to step 225, where the user saves the meals for that day. The process can be repeated by going back to step 205. The overview process 200 ends with step 299.

Figure 3:
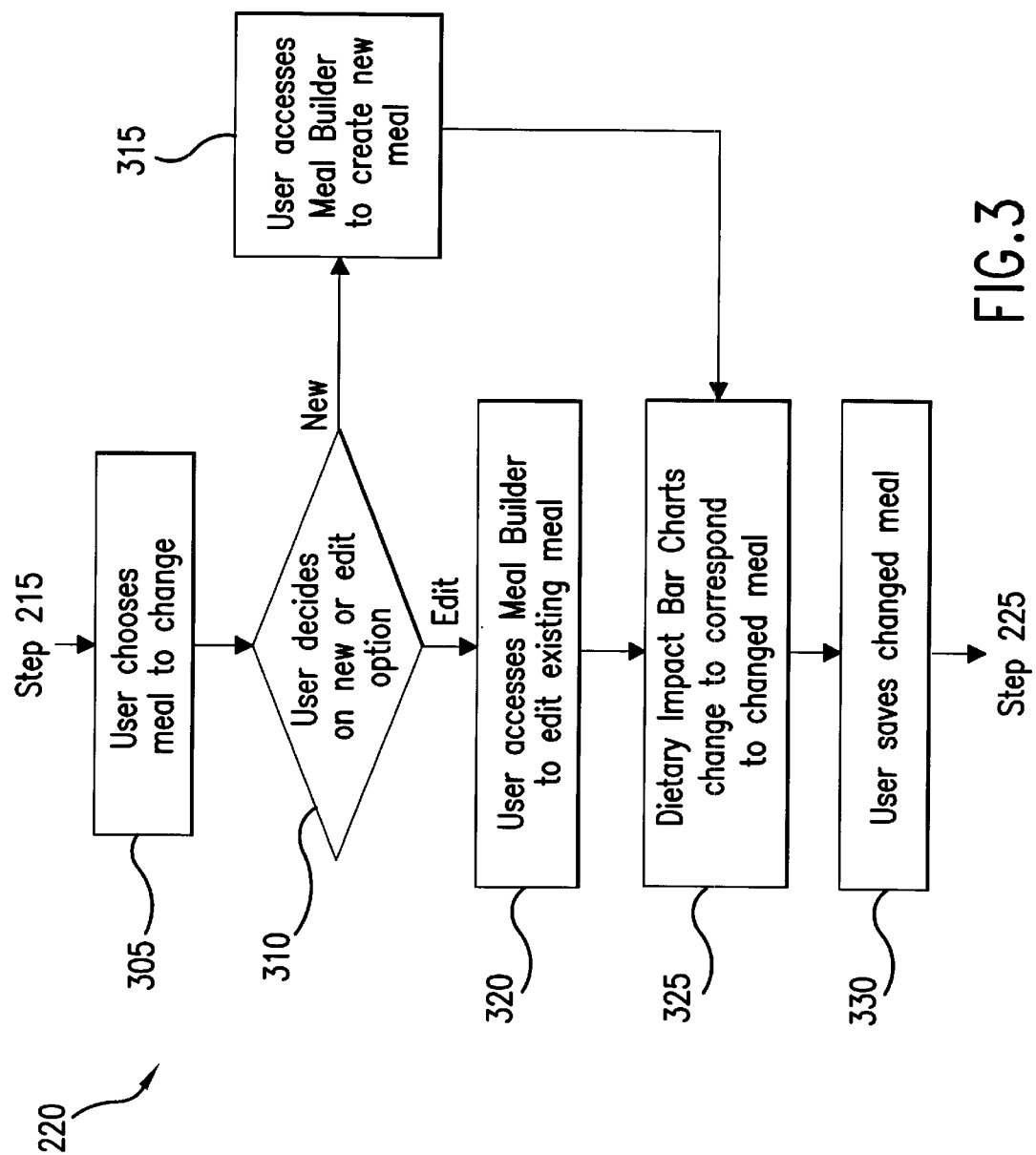
FIG. 3 is a flow chart illustrating an exemplary process for editing the user choices, as set forth in FIG. 2.

FIG. 3 is a flow chart illustrating an exemplary process for editing the user choices, as set forth in step 220 of FIG. 2. In step 305, the user chooses the meal he wants to change. In step 310, the user chooses the Edit or New option. If the user chooses the Edit option, the process moves to step 320, where the user accesses the Meal Builder 120 to edit the chosen meal. The user can edit a particular meal by removing, adding, decreasing, substituting, etc. food items, starting with the meal the user has chosen to edit. If the user chooses the New option, the process moves to step 315, where the user accesses the Meal Builder 120 to change the chosen meal. The user can choose a new meal by removing, adding, decreasing, substituting, etc. food items, starting with an empty plate. The user can change a particular meal by removing, adding, or substituting a food item.

Alternatively, the user can load a previously saved meal (and edit this if he chooses). Steps 315 and 320 move to step 325, where the Dietary Impact Bar Charts are changed to correspond to the changed meal. In step 330, the user saves the changed meal.

Figure 4:
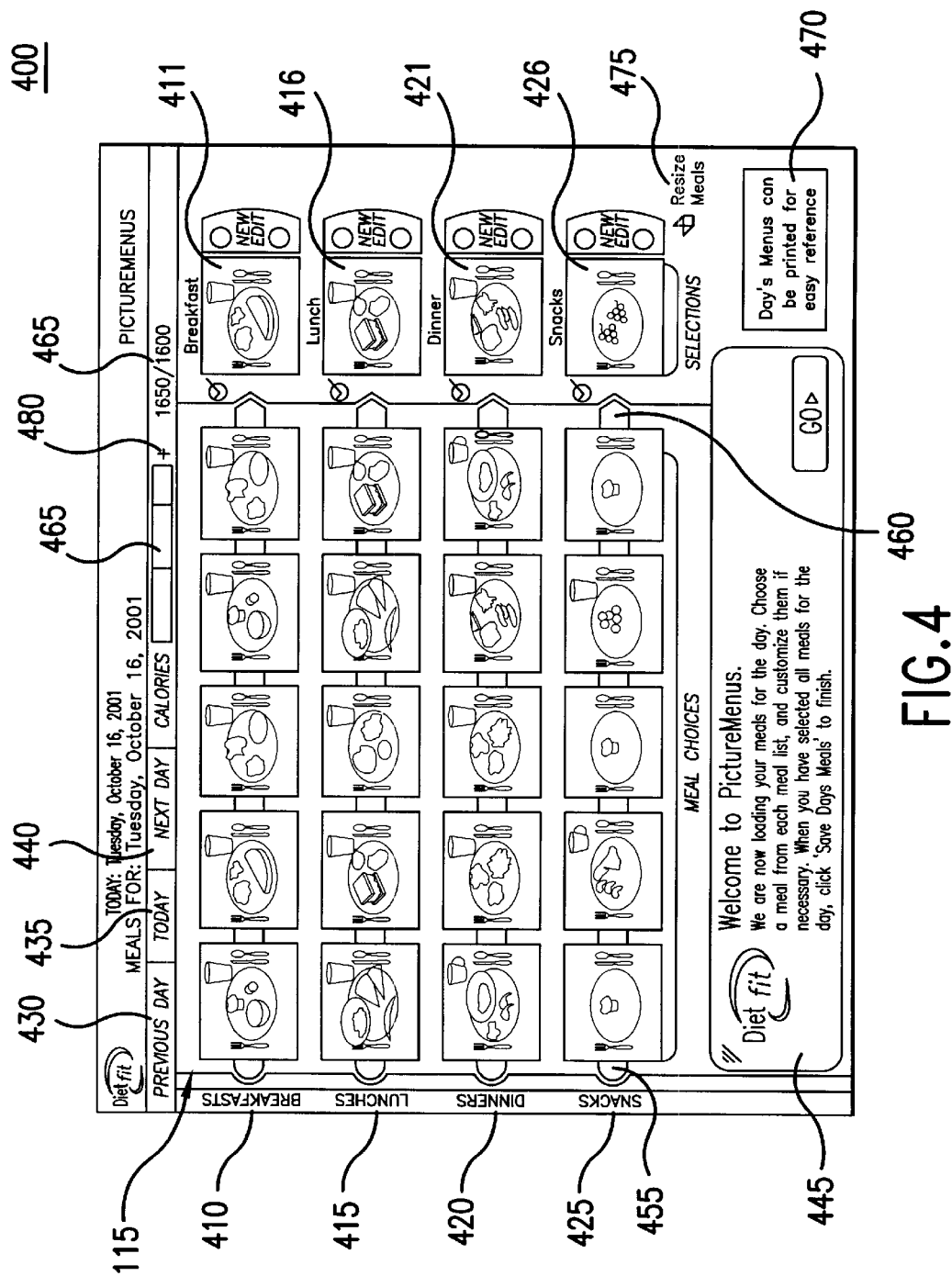
FIGS. 4–6 are exemplary screen shots illustrating the Picture Menus.

FIG. 4 illustrates an exemplary screen shot 400 illustrating the Picture Menus 115. In this exemplary embodiment, the program has indicated, or the user has chosen, that he should follow a 1600 calorie diet. With this 1600 calorie goal, a breakfast, lunch, snack, and dinner can be combined to create the right number of calories.

The user chooses the breakfast, lunch, snack and dinner he wants for the day. These meals do not need to be well-balanced meals, but as a combination need to meet the 1600 calorie goal. The Breakfast Choices 410 indicate the meals the user can choose for breakfast. The Breakfast Choice 411 is boxed and indicates the user's breakfast choice for the particular day he is planning. The Lunch Choices 415 indicate the meals the user can choose for lunch. The Lunch Choice 416 is boxed and indicates the user's lunch choice for the particular day he is planning. The Dinner Choices 420 indicate the meals the user can choose for dinner. The Dinner Choice 421 is boxed and indicates the user's dinner choice for the particular day he is planning. The Snack Choices 425 indicate the meals the user can choose for snacks. The Snack Choice 426 is boxed and indicates the user's snack choice for the particular day he is planning. The Save Day's Meals 445 saves the choices 411, 416, 421, and 426 the user has made for a particular day.

The user can Scroll Back 455 or Scroll Forward 460 on the Breakfast Choices 410, Lunch Choices 415, Dinner Choices 420, and Snack Choices 425. The user can choose or review the current day's meals by the Today Indicator 435. The user can also look at meals for the Previous Day 430 or the Next Day 440. The user can view the current calorie level in a bar graph and number form on the Nutrient Indicator 465. While this is set for calories, any nutrient or quantifier, such as protein, can be measured on the Dietary Impact 465. (This can be another type of indicator, such as any type of nutritional indicator.) Usually the user will try to make his choices closely match his dietary goals. If the user exceeds those goals, he will receive a + Warning Signal 480. The user can print the Day's Menus using the Print 470. The user can also record the menus in a health diary, print the menu, generate a customized shopping list that incorporates the meals chosen, record his weight, and track his progress. Graphs for these options can also be provided.

Figure 5:
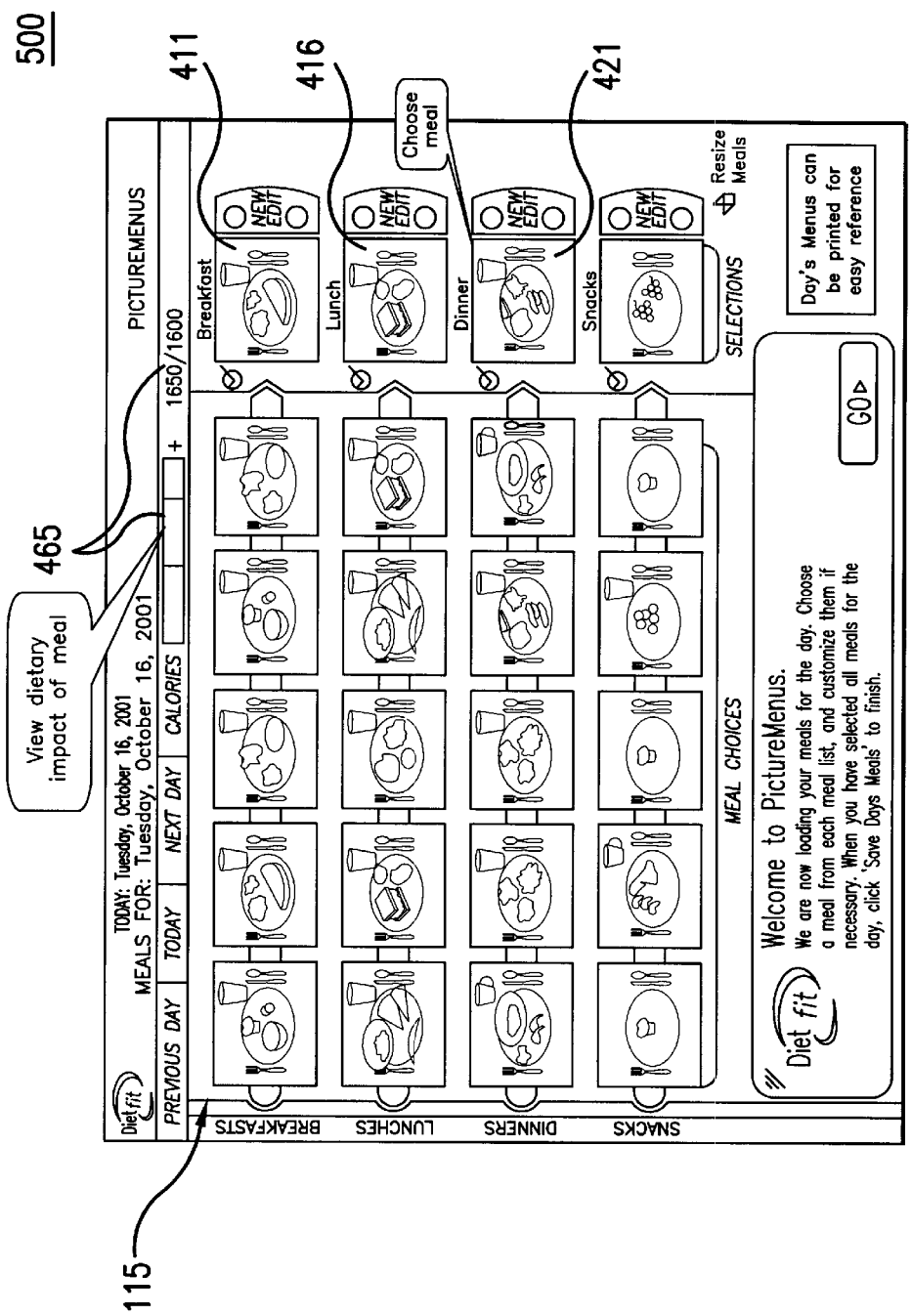

FIG. 5 is an exemplary screen shot 500 illustrating a use of the Picture Menus 115. The user has already indicated a Breakfast Choice 411 and Lunch Choice 416. The user chooses a Dinner Choice 421 comprising barbequed chicken, baked potatoes, and beans. The user views the Dietary Impact 465 (here it is calories, although this could be a nutritional or other impact) of the Dinner Choice 421 on his daily allowance, and sees that with his dinner choice, he has used 1650 (more than his allocated 1600) calories.

Figure 6:
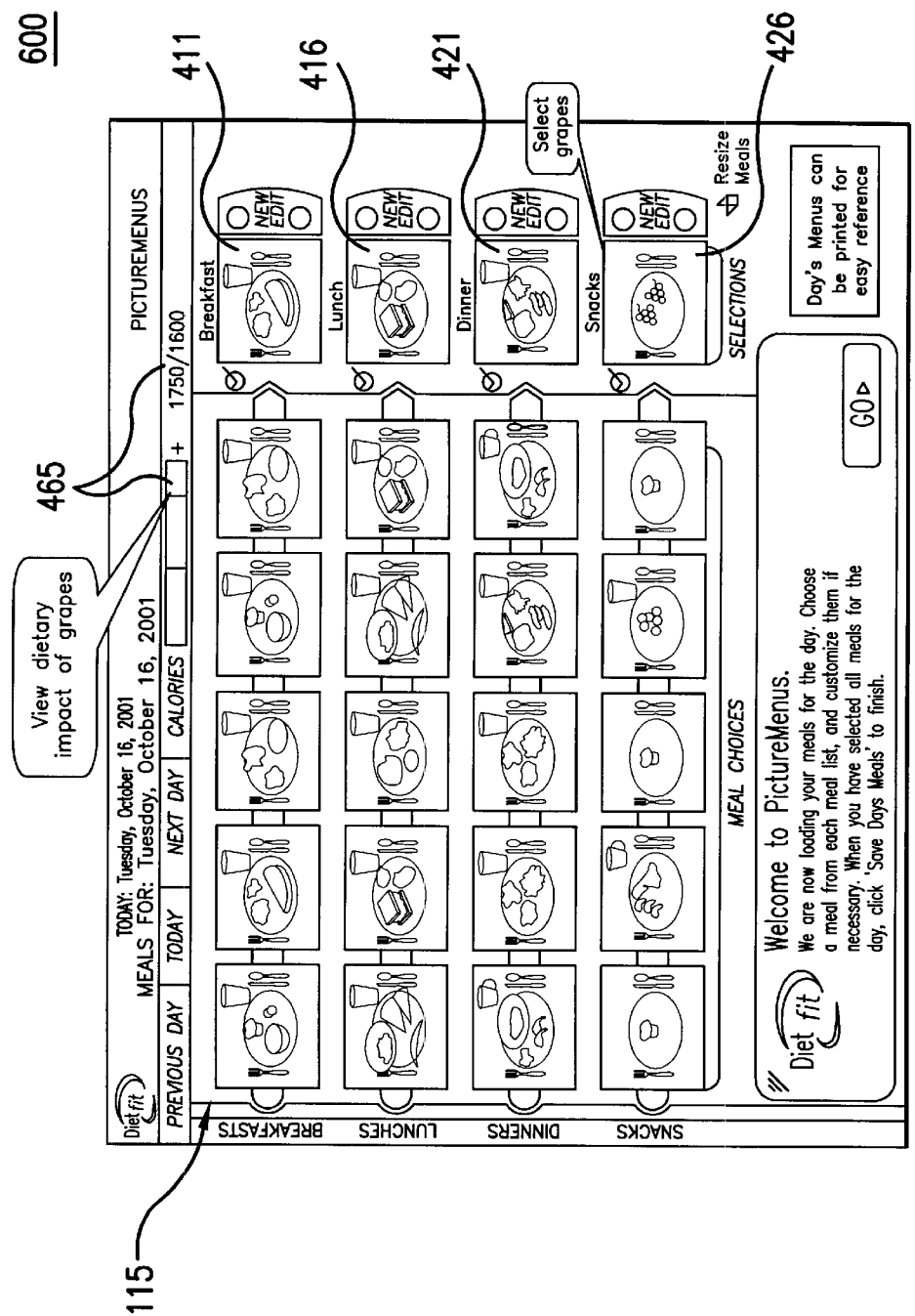

FIG. 6 is an exemplary screen shot 600 illustrating another use of the Picture Menus 115. The user has already indicated a Breakfast Choice 411, Lunch Choice 416, and Dinner Choice 421. The user adds a Snack Choice 426 of grapes. The user views the Dietary Impact 465 of the grapes on his daily allowance, and sees that the addition of the grapes makes it so he has used 1750 instead of 1650 calories.

Figure 7:
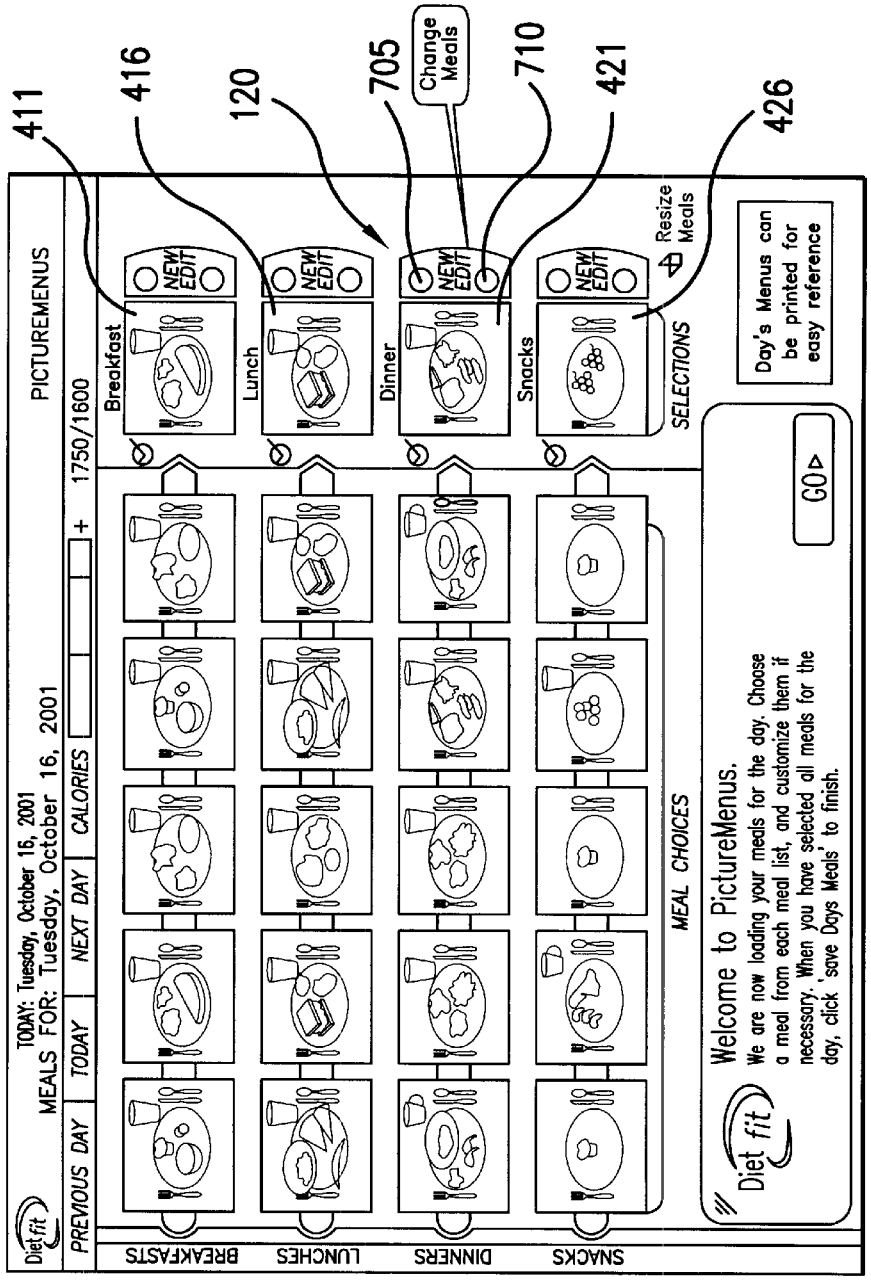
FIGS. 7–10 are exemplary screen shots illustrating the Meal Builder, and how it can be incorporated into the Picture Menus.

FIG. 7 is an exemplary screen shot 700 illustrating the Meal Builder 120. The user can change an existing Choice 411, 416, 421, or 426 using Edit 710 or New 705. For example, the user can choose to change the Dinner Choice 421. Once the user chooses the Edit 710 or the New 705, the current Dinner Choice 421 will be shown in the Meal Builder 120.

Figure 8:
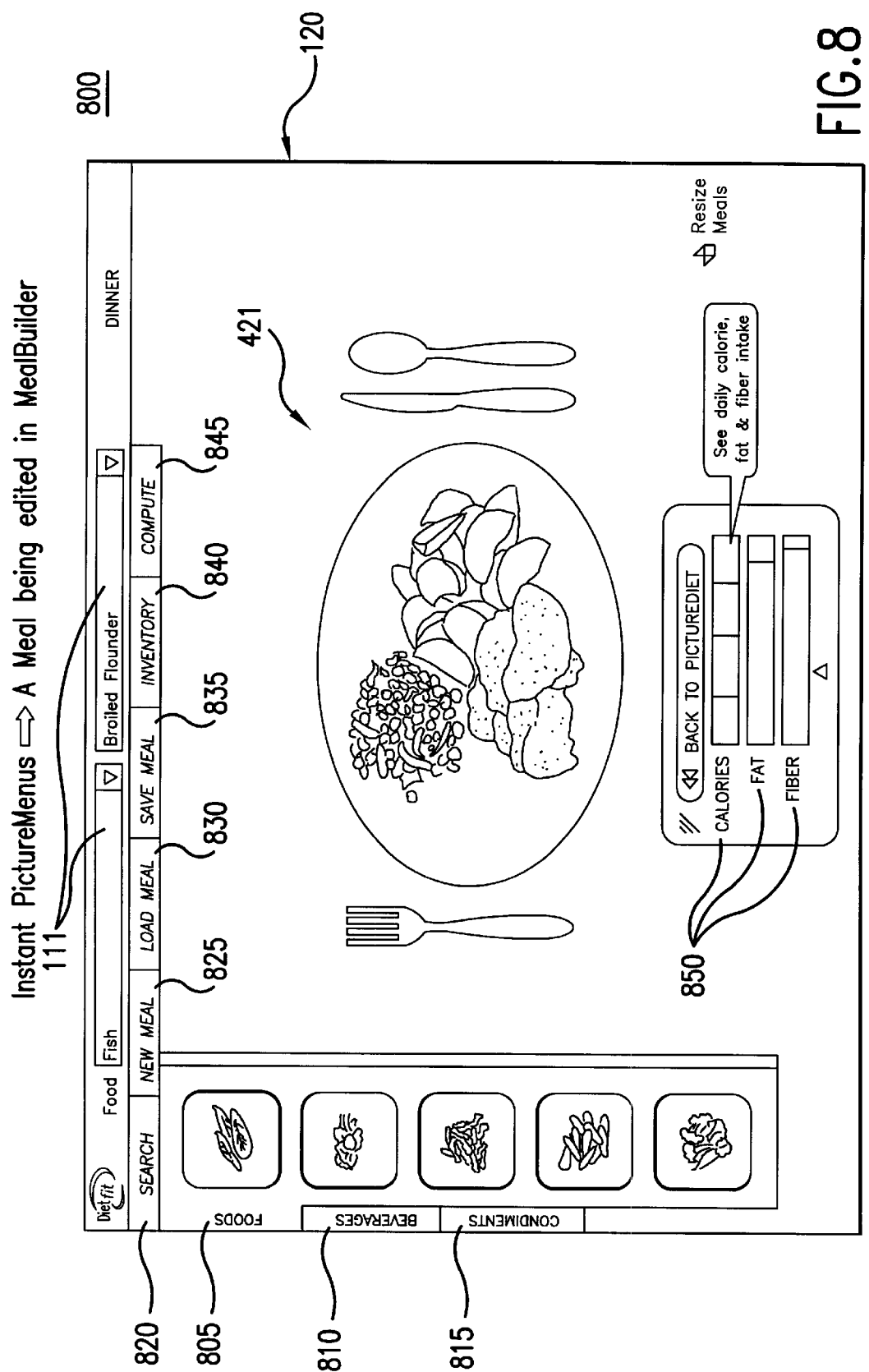

FIG. 8 is an exemplary screen shot 800 illustrating a use of the Meal Builder 120 for Dinner Choice 421. The current Dinner Choice 421, comprising barbequed chicken, baked potatoes, and beans, is shown. The user can access the Search 820, the New Meal 825, the Load Meal 830, the Save Meal 835, the Inventory 840, and the Compute 845. The Search 820 allows a user to search for a food in the Food Database 111. The New Meal 825 will display an empty plate and allow the user to create a meal. The Load Meal 830 will allow the user to choose from saved meals that he already has. The Save Meal 835 allows the user to save a new meal he has created and give it a name. The Inventory 840 provides a written list of the foods on the plate. The Compute 845 allows the user to see the impact of the foods on the plate on his dietary goals. On some of these features, the user can access or provide recipes or details about certain foods.

The Dinner Choices 420 in the Meal Builder 120 is immediately associated with an increase in the user of the allotted amounts of calories and nutrients. This serves to show how adding each meal increases the calorie and nutrient intake during the day and how the impact of food choices can be seen in the bar charts. Excesses and deficiencies can be easily spotted and remedied. Other nutrients can be seen on demand, as can a more detailed numerical analysis.

If the user is using the New 705, the user is presented with a clean plate. The user then activates the window containing the desired food, and drags that food onto the plate. In the Dinner Choices 420, the user can choose from different Foods 805, Beverages 810, and Condiments 815. The user can adjust portions by clicking on each food on the plate and then selecting a plus or minus button. An "X" button removes the food from the plate.

As foods are added or removed, the user will see the Dietary Impact Bar Charts 850 change immediately. In this example, the calorie, fat, and fiber intake is shown. This indicates the contribution each food makes to the user's nutrition and calorie intake. Condiments and beverages are added in a similar way. Using Meal Builder 120, the user can build his own personal library of favorite meals.

Figure 9:
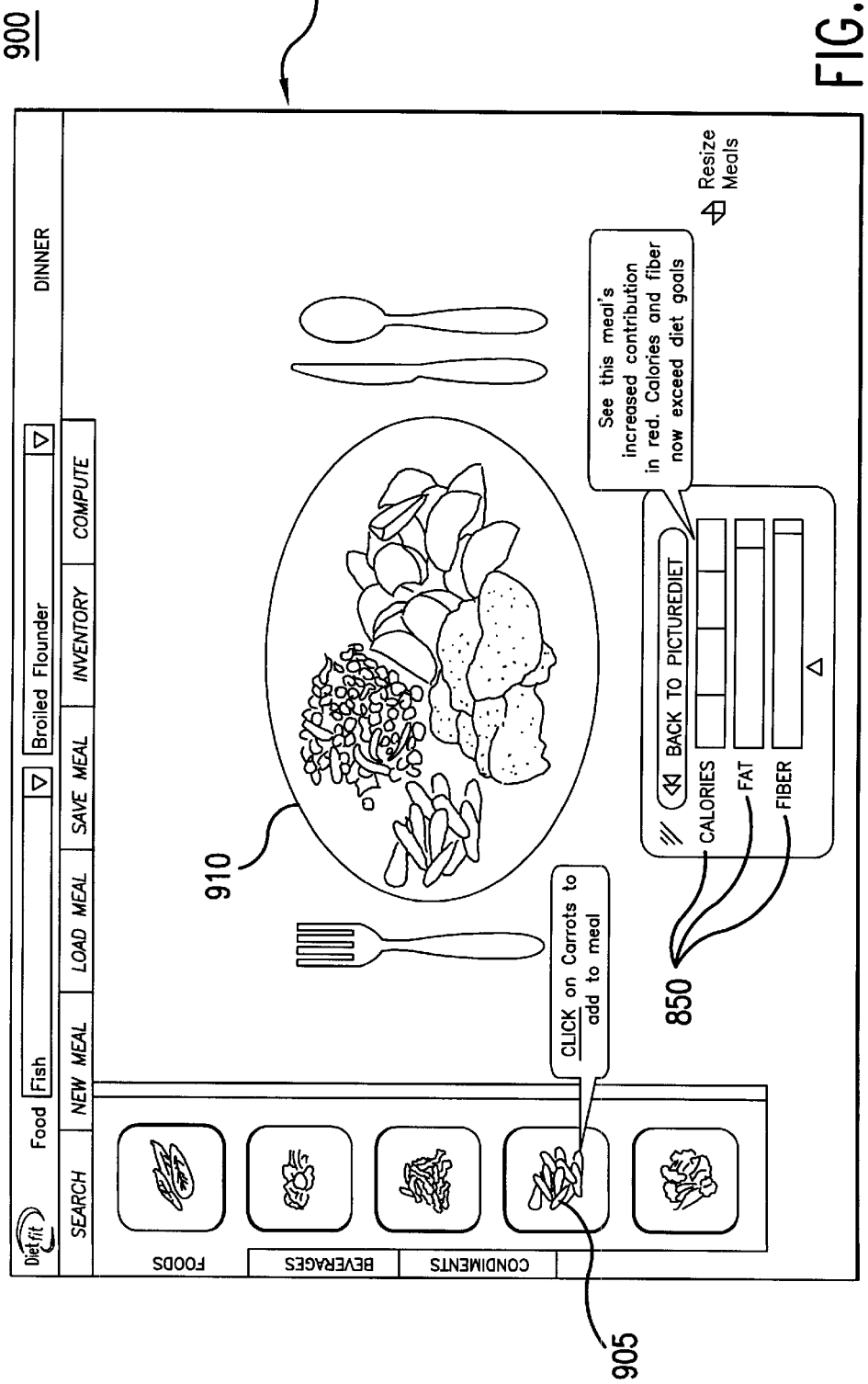

FIG. 9 is an exemplary screen shot 900 of a use of the Meal Builder 120. In this example, the user clicks on the Carrot Choice 905. The Carrot Choice 905 then appears on the Plate 910. The user is able to adjust the portion size of the Carrot Choice 905 and see the Dietary Impact Bar Charts 850 change to correspond to the different portion sizes of the Carrot Choice 905.

Figure 10:
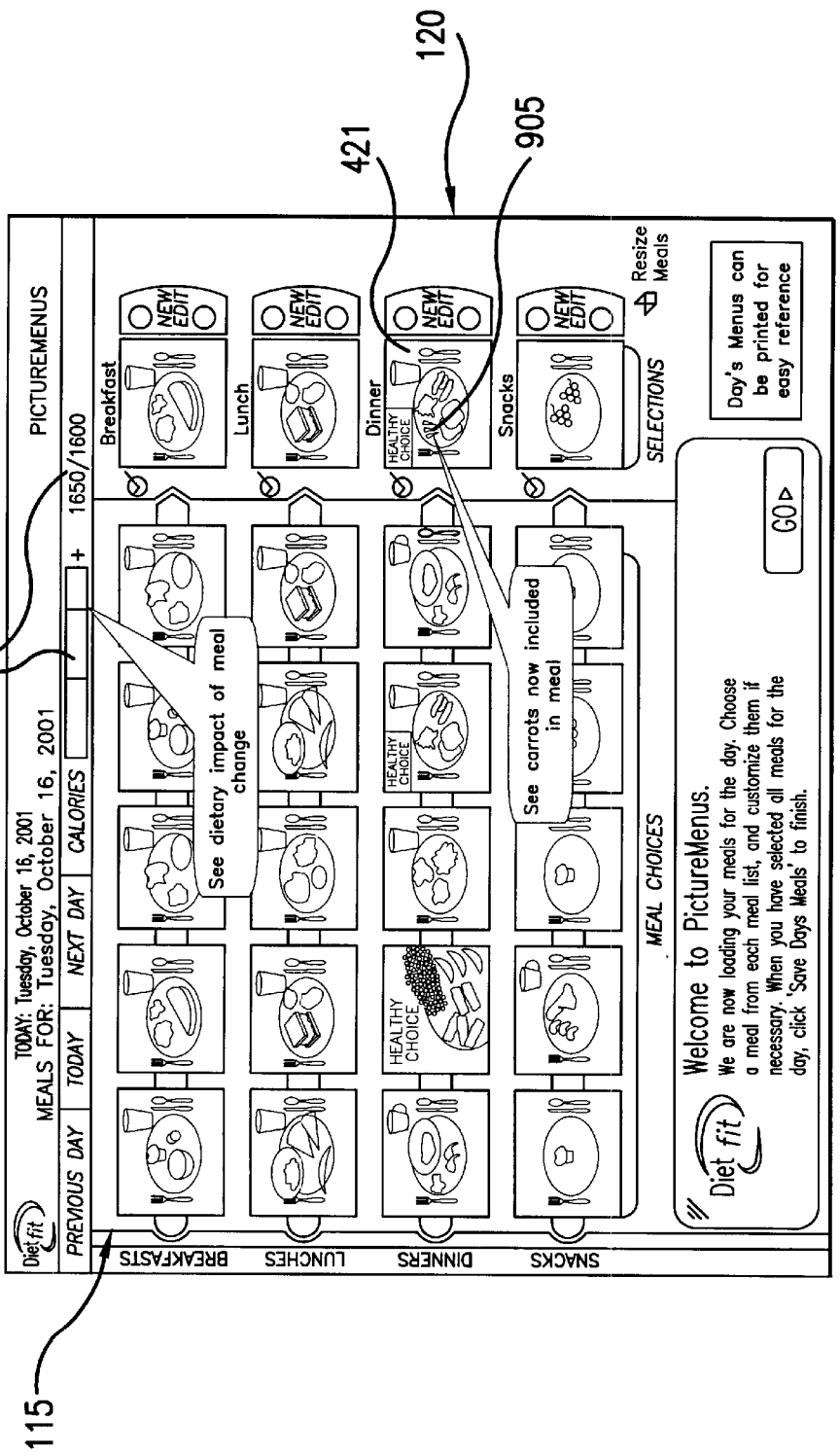

FIG. 10 is an exemplary screen shot 1000 of a use of the Meal Builder 120, as accessed in the Picture Menus 115. Once the user saves the Carrot Choice 905 on his Dinner Choice 421, the user is taken back to the Picture Menus 115. The user can see the Carrot Choice 905 included in his Dinner Choice 421. The user can also see the Dietary Impact 465 of the meal change, with the inclusion of the Carrot Choice 905.

What is claimed is:

1. A system of computerized meal planning, comprising:
   a User Interface;
   a Database of food objects organizable into meals; and
   at least one Picture Menus, which displays on the User Interface meals from the Database that a user can select from to meet customized eating goal.

2. A system of computerized meal planning, comprising:

a User Interface;

a Database of food objects; and a Meal Builder, which displays on the User Interface meals from the Database, and wherein a user can change content of said meals and view the resulting meals' impact on customized eating goals.

3. The system of claim 1, further comprising:

a Meal Builder, which displays on the User Interface meals from the Database, corresponding to the Picture Menus, where the user can change the content of said meal's and view the resulting meal's impact on customized eating goals.

4. The system of claim 1, wherein the meal planning is designed to impact eating behavior.

5. The system of claim 1, wherein food objects are food images.

6. The system of claim 1, wherein the Database further comprises:

a Food Database comprising the food objects incorporated into the Meal Builder; and a Meal Database comprising various combinations of the food objects designated as meals and incorporated into the Meal Builder and the Picture Menus.

7. The system of claim 1, wherein the Database is based on a behavior analysis comprising collecting and analyzing specific information on a user's instinctive tendencies and preferences.

8. The system of claim 6, wherein the Food Database and the Meal Database are based on a behavior analysis comprising collecting and. analyzing specific information on a user's instinctive tendencies and preferences.

9. The system of claim 7, wherein the behavior analysis further comprises comparing the specific information to a set of goals.

10. The system of claim 7, wherein the behavior analysis is a diet behavior analysis comprising collecting and analyzing specific information on a user's instinctive eating tendencies and preferences.

11. The system of claim 10, wherein the diet behavior analysis further comprises comparing the specific information to a set of customized eating goals.

12. A method of computerized planning that can influence behavior, comprising:

preparing a Database of food objects;

allowing a user to choose meals from one or more Picture Menus, which display on a User Interface meals comprised from the food objects from the Database that the user can mix and match to meet customized eating goals, for a particular amount of time; and allowing a user to save the meals.

13. A method of computerized planning that can influence behavior, comprising:

preparing a Database of food objects;

allowing the user to decide whether or not to change one or more meals comprising food objects; and if the user decides to change one or more of the meals, allowing the user to change the meals using a Meal Builder, which displays on the User Interface the food objects from the meals from the Database, corresponding to the Picture Menus, where the user can change and view the meals' impact on customized eating goals.

14. The system of claim 12, further comprising:

allowing the user to decide whether or not to change one or more of the meals; and if the user decides to change one or more of the meals, allowing the user to change the meals using a Meal Builder, which displays on the User Interface the food objects from the meals from the Database, corresponding to the Picture Menus, where the user can change and view the meals' impact on customized eating goals.

15. The system of claim 12, further comprising the step of incorporating a behavioral analysis comprising collecting and analyzing specific information on a user's instinctive tendencies and preferences into the Database.

16. The system of claim 15, wherein the behavior analysis further comprises comparing the specific information to a set of goals.

17. The system of claim 15, wherein the behavior analysis is a diet behavior analysis comprising collecting and analyzing specific information on a user's instinctive eating tendencies and preferences.

18. The system of claim 17, wherein the diet behavior analysis further comprises comparing the specific information to a set of customized eating goals.

* * * * *

US006585516C1

(12) INTER PARTES REEXAMINATION CERTIFICATE (700th)
United States Patent
Alabaster

(10) Number: US 6,585,516 C1
(45) Certificate Issued: Oct. 2, 2013

(54) METHOD AND SYSTEM FOR COMPUTERIZED VISUAL BEHAVIOR ANALYSIS, TRAINING, AND PLANNING

(75) Inventor: Oliver Alabaster, Alexandria, VA (US)

(73) Assignee: Dietgoal Innovations LLC, Austin, TX (US)

Reexamination Request:
No. 95/001,959, Apr. 9, 2012

Reexamination Certificate for:
Patent No.: 6,585,516
Issued: Jul. 1, 2003
Appl. No.: 10/040,465
Filed: Jan. 9, 2002

Related U.S. Application Data

(63) Continuation-in-part of application No. 09/734,711, filed on Dec. 13, 2000, now abandoned, which is a continuation-in-part of application No. 09/461,664, filed on Dec. 14, 1999, now Pat. No. 6,553,386, which is a continuation-in-part of application No. 09/211,392, filed on Dec. 14, 1998, now abandoned.

(51) Int. Cl.
*G09B 19/00* (2006.01)

(52) U.S. Cl.
USPC .......................................... 434/127; 128/921

(58) Field of Classification Search
None
See application file for complete search history.

(56) References Cited

To view the complete listing of prior art documents cited during the proceeding for Reexamination Control Number 95/001,959, please refer to the USPTO's public Patent Application Information Retrieval (PAIR) system under the Display References tab.

*Primary Examiner* — Ovidio Escalante

(57) ABSTRACT

A system and method for computerized visual behavior analysis, training, and planning. The system includes a User Interface (UI), a Meal Database, a Food Database, a Picture Menus, and a Meal Builder. The method can include the following steps. First, the Meal Database and the Food Database can be prepared. Second, the user can use the Picture Menus to choose meals for a particular time period to correspond to a customized eating plan. Third, the user can decide whether or not to change one or more of the meals he has chosen for the particular time period. If the user decides to change his chosen meals, the user can edit or create new meals using the Meal Builder. If the user decides not to change his choices, or after the user changes his choices, the user can save the meals for the particular time period.

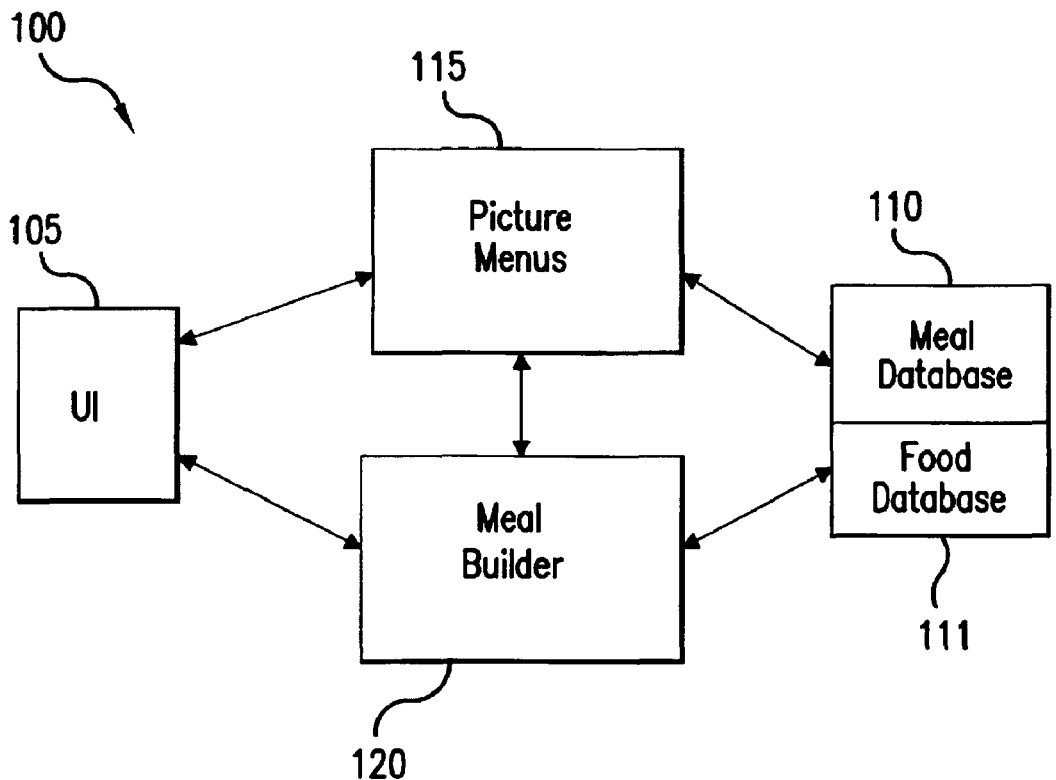

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1 lines 4-5:

*REFERENCES*

*This application is a continuation in part of U.S. application Ser. No. 09/734,711 (filed on Dec. 13, 2000 and abandoned on May 29, 2003) which was currently pending at the time this application was filed (this application was filed on Jan. 9, 2002), and which is a continuation in part of U.S. Ser. No. 09/461,664, filed Dec. 14, 1999 (issued on Apr. 22, 2003 as U.S. Pat. No. 6,553,386), which is a continuation in part of U.S. Ser. No. 09/211,392 filed on Dec. 14, 1998 (abandoned on Nov. 18, 2002).*

AS A RESULT OF REEXAMINATION, IT HAS BEEN DETERMINED THAT:

The patentability of claims 1-18 is confirmed.

New claims 19-61 are added and determined to be patentable.

*19. The system of claim 1, wherein the User Interface receives a command identifying a food object or a meal that the user likes or dislikes.*

*20. The system of claim 19, wherein a meal is removed or added to the display on the User Interface based on the command.*

*21. The system of claim 20, wherein the one or more meals displayed on the User Interface are changed in real-time based on the command.*

*22. The system of claim 1, wherein the Database stores information associated with a meal that the user likes.*

*23. The system of claim 1, wherein the user can select one or more of the displayed meals to store in the Database.*

*24. The system of claim 1, wherein the one or more displayed meals correspond to at least one of a selected nutritional value, a selected caloric value, a selected personal characteristic, and a selected activity level.*

*25. The system of claim 1, wherein the User Interface displays nutritional information for a given meal adjacent an image of the given meal.*

*26. The system of claim 1, wherein the User Interface displays a daily nutrition allowance value and displays an impact of a selected meal on the daily nutrition allowance value.*

*27. The system of claim 1, wherein the Database includes information provided by a plurality of users for a meal.*

*28. The system of claim 27, wherein the information includes at least one of a selection indication, a rating, a review, and a survey response.*

*29. The system of claim 1, wherein the User Interface displays at least one customized eating goal for selection by the user.*

*30. The system of claim 29, wherein a meal is added to or removed from display on the User Interface in response to selection of one or more of the at least one customized eating goals.*

*31. The system of claim 1, wherein the User Interface displays one or more controls for modifying a meal by at least one of changing a type of food object associated with the meal and changing an amount of a food object associated with the meal.*

*32. The system of claim 31, wherein the User Interface displays revised nutrition information for the meal when the type or the amount of the food object is changed.*

*33. The system of claim 1, wherein the User Interface displays a control for selecting a food object to include in or remove from a meal.*

*34. The system of claim 33, wherein the User Interface displays revised nutrition information for the meal when the food object is included in or removed from the meal.*

*35. The system of claim 1, wherein the User Interface displays a control for selecting a nutritional value for a meal or a food object.*

*36. The system of claim 1, wherein the User Interface displays a list of food objects associated with the meals in the Database.*

*37. The system of claim 2, wherein the Meal Builder displays on the User Interface an image of a meal.*

*38. The system of claim 2, wherein the Meal Builder displays on the User Interface revised nutrition information in real-time for a resulting meal as the content of the resulting meal is changed.*

*39. The system of claim 2, wherein the content of a meal includes a food object associated with the meal.*

*40. The system of claim 39, wherein the Meal Builder displays on the User Interface an image of the food object.*

*41. The system of claim 2, wherein the Meal Builder provides a search function allowing the user to search for a meal containing a food object.*

*42. The system of claim 2, wherein the Meal Builder provides a compute function for computing revised nutrition information for the resulting meal.*

*43. The system of claim 2, wherein the Meal Builder includes a field associated with a food object or a meal, and wherein the field is adapted to receive comments from the user about the food object or the meal.*

*44. The system of claim 2, wherein the User Interface is configured to receive a command identifying a food object or a meal that the user likes or dislikes.*

*45. The system of claim 44, wherein a meal is removed or added to the display on the User Interface based on the command.*

*46. The system of claim 45, wherein the one or more meals displayed on the User Interface are changed in real-time based on the commands.*

*47. The system of claim 2, wherein the Database stores information associated with a meal that the user likes.*

*48. The system of claim 2, wherein the user can select one or more of the displayed meals to store in the Database.*

*49. The system of claim 2, wherein the one or more displayed meals correspond to at least one of a selected nutritional value, a selected caloric value, a selected personal characteristic, and a selected activity level.*

*50. The system of claim 2, wherein the User Interface displays nutritional information for a given meal adjacent an image of the given meal.*

51. The system of claim 2, wherein the User Interface displays a daily nutrition allowance value and displays an impact of a selected meal on the daily nutrition allowance value.

52. The system of claim 2, wherein the Database includes information provided by a plurality of users for a meal.

53. The system of claim 52, wherein the information includes at least one of a selection indication, a rating, a review and a survey response.

54. The system of claim 2, wherein the User Interface displays at least one customized eating goal for selection by the user.

55. The system of claim 54, wherein at least one meal is added to or removed from display on the User Interface in response to the selection of one or more of the at least one customized eating goals.

56. The system of claim 2, wherein the User Interface displays one or more controls for modifying a meal by at least one of changing a type of food object associated with the meal and changing an amount of a food object associated with the meal.

57. The system of claim 56, wherein the User Interface displays revised nutrition information for the meal when the type or the amount of the food object is changed.

58. The system of claim 2, wherein the User Interface displays a control for selecting a food object to include in or remove from a meal.

59. The system of claim 58, wherein the User Interface displays revised nutrition information for the meal when the food object is selected for inclusion in or removal from the meal.

60. The system of claim 2, wherein the User Interface displays a control for selecting a nutritional value for a meal or a food object.

61. The system of claim 2, wherein the User Interface displays a list of food objects associated with the meals in the Database.

* * * * *